(12) United States Patent
Conrad et al.

(10) Patent No.: US 12,044,783 B2
(45) Date of Patent: Jul. 23, 2024

(54) METHOD AND DEVICE FOR DETECTING A GROUP RUNTIME VARIATION FOR A NAVIGATION SENSOR FOR A NAVIGATION SYSTEM FOR A VEHICLE AND NAVIGATION SENSOR WITH A DEVICE OF THIS KIND

(71) Applicant: Robert Bosch GmbH, Stuttgart (DE)

(72) Inventors: Henry Conrad, Markgroeningen (DE); Safwat Irteza Butt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 17/757,259

(22) PCT Filed: Nov. 18, 2020

(86) PCT No.: PCT/EP2020/082511
§ 371 (c)(1),
(2) Date: Jun. 13, 2022

(87) PCT Pub. No.: WO2021/121841
PCT Pub. Date: Jun. 24, 2021

(65) Prior Publication Data
US 2023/0003905 A1 Jan. 5, 2023

(30) Foreign Application Priority Data
Dec. 19, 2019 (DE) .................. 10 2019 220 123.7

(51) Int. Cl.
*G01S 19/39* (2010.01)
*G01S 19/25* (2010.01)
*G01S 19/26* (2010.01)

(52) U.S. Cl.
CPC .......... *G01S 19/396* (2019.08); *G01S 19/252* (2013.01); *G01S 19/26* (2013.01)

(58) Field of Classification Search
None
See application file for complete search history.

(56) References Cited

U.S. PATENT DOCUMENTS

| 5,949,372 A | 9/1999 | Lennen |
| 10,578,744 B2 * | 3/2020 | Carrie .................. G01S 19/235 |

(Continued)

FOREIGN PATENT DOCUMENTS

| EP | 2 154 543 A1 | 2/2010 |
| JP | H11-183585 A | 7/1999 |

OTHER PUBLICATIONS

International Search Report corresponding to International Patent Application No. PCT/EP2020/082511, mailed Feb. 22, 2021 (5 pages).

*Primary Examiner* — Todd Melton
(74) *Attorney, Agent, or Firm* — Maginot, Moore & Beck LLP

(57) ABSTRACT

The approach presented here relates to a method for detecting a group runtime variation for a navigation sensor for a navigation system for a vehicle. The method comprises a step of reading and a step of determining. In the reading step, at least one first GNSS simulator signal is read from a virtual satellite of a virtual global navigation satellite system at a first time and a second GNSS simulator signal is read from the virtual satellite or from at least one second virtual satellite of the virtual navigation satellite system at a second time different to the first time by means of a read device. The group runtime variation is determined using the first GNSS simulator signal and the second GNSS simulator signal in the determining step.

13 Claims, 1 Drawing Sheet

(56) References Cited

U.S. PATENT DOCUMENTS

2007/0273580 A1 11/2007 Tekawy et al.
2010/0001898 A1 1/2010 Fu et al.
2014/0062782 A1 3/2014 Abraham

* cited by examiner

METHOD AND DEVICE FOR DETECTING A GROUP RUNTIME VARIATION FOR A NAVIGATION SENSOR FOR A NAVIGATION SYSTEM FOR A VEHICLE AND NAVIGATION SENSOR WITH A DEVICE OF THIS KIND

This application is a 35 U.S.C. § 371 National Stage Application of PCT/EP2020/082511, filed on Nov. 18, 2020, which claims the benefit of priority to Serial No. DE 10 2019 220 123.7, filed on Dec. 19, 2019 in Germany, the disclosures of which are incorporated herein by reference in their entirety.

BACKGROUND

The approach is based on a device or a method as described in the disclosure. A computer program also forms the subject-matter of the present approach.

In manufacturing, the quality of the high-frequency path of a navigation module must be monitored with the components installed therein at the end of the line. An important parameter here is the group delay variation. Differences in the delay directly affect the positional accuracy of the navigation module.

SUMMARY

Against this background, a method for detecting a group delay variation for a navigation sensor for a navigation system for a vehicle using the approach presented here, furthermore a device which uses this method, a navigation sensor having this device, and finally a corresponding computer program according to the disclosure are presented. Advantageous developments and improvements of the device indicated in the disclosure are possible by means of the measures described in the embodiments.

The advantages achievable with the presented approach consist in providing a possibility for detecting a group delay variation for a navigation sensor, for example in the manufacture of the navigation sensor. It can thus be ensured that a position of the navigation sensor or of a vehicle having a navigation sensor is correctly calculated during the operation of the navigation sensor.

A method is presented for detecting a group delay variation for a navigation sensor for a navigation system for a vehicle. The method comprises a reading step and a determining step. In the reading step, at least one first GNSS simulator signal is read by means of a read device from a virtual satellite of a virtual global navigation satellite system at a first time and a second GNSS simulator signal is read from a virtual satellite or from at least one second virtual satellite of a virtual navigation satellite system at a second time different from the first time. The group delay variation is determined using the first GNSS simulator signal and the second GNSS simulator signal in the determining step.

This method can be implemented, for example, in software or hardware or in a hybrid form of software and hardware, for example in a control device.

The abbreviation "GNSS" stands for and designates a "Global Navigation Satellite System". The virtual global navigation satellite system is a simulated navigation satellite system scenario. This virtual navigation satellite system can comprise only the one virtual satellite, or additionally the second virtual satellite or any number of further virtual satellites. The navigation satellite system scenario can, for example, be a virtual static GLONASS scenario with as many virtual GLONASS satellites as possible. GLONASS stands for and describes a "Global Navigation Satellite System" which is operated by the Russian Federation. The read device can comprise at least one GNSS receiver or can be designed to read received signals of such GNSS receivers of the navigation sensor from the GNSS receivers.

This method can be carried out, for example, in the manufacture of the navigation sensor and can be part of an "end-of-line" test or "end-of-life" test in which a reliability or function of the navigation sensor is tested prior to an intended use.

In the determining step, the GNSS simulator signal can be evaluated in order to obtain a first measured quantity, and the second GNSS simulator signal can be evaluated in order to obtain a second measured quantity, wherein the group delay variation is determined using the first measured quantity and the second measured quantity. The GNSS simulator signals can in each case comprise, for example, a timestamp which represents a transmit time of the respective GNSS simulator signal from the respective virtual satellite. Using a further timestamp which represents a receive time of the respective GNSS simulator signal by means of the read device or the GNSS receiver, the delay of the individual GNSS simulator signals can then be calculated by forming a difference from the timestamp and the further timestamp.

According to one embodiment, the first GNSS simulator signal can be evaluated in the determining step in order to obtain a first pseudo distance representing a distance from the virtual satellite to the read device as the first measured quantity, and the second GNSS simulator signal can be evaluated in order to obtain a second pseudo distance representing a distance from the second virtual satellite to the read device as the second measured quantity. A pseudo distance, also referred to as a pseudo path or pseudorange, designates the first approximation of the distance between a transmitter and a receiver from the delay of the radio signal. Pseudo (meaning false, fictitious), given that, due to the major factor of the speed of light (300 meters per microsecond), even slight clock errors result in the pseudo paths becoming unusable as a direct measure of the distance.

The group delay variation can be determined in the determining step by forming the difference between the first measured quantity and the second measured quantity. In the determining step, for example, the group delay variation can be determined by forming the difference between the first pseudo distance and the second pseudo distance. This provides a fast method for detecting the group delay variation.

In the reading step, for example, the first GNSS simulator signal can be read from a virtual GLONASS satellite or virtual GPS satellite or virtual Galileo satellite and additionally or alternatively the second GNSS simulator signal can be read from a virtual GLONASS satellite or virtual GPS satellite or virtual Galileo satellite. Different virtual GLONASS satellites can transmit signals at a different frequency here. Different virtual GPS satellites can transmit signals at the same frequency. This offers a possibility for determining the group delay variation using a variety of virtual satellite types.

According to one embodiment, the first GNSS simulator signal and the second GNSS simulator signal which have different frequencies can be read in the reading step. The first GNSS simulator signal and the second GNSS simulator signal can be read here from different GLONASS satellites which each transmit signals at their own frequency.

In the reading step, the first GNSS simulator signal and the second GNSS simulator signal can be read from the virtual satellite and from the second virtual satellite which have a simulated same distance to the read device. An embodiment of this type offers the advantage of minimizing possible errors in determining the group delay variation by means of the same simulated distance of the satellites from the read device.

Alternatively, however, in the reading step, the first GNSS simulator signal and the second GNSS simulator signal can be read from the virtual satellite and from the second virtual satellite which have simulated different distances to the read device.

It is further advantageous if, according to one embodiment, the first GNSS simulator signal and the second GNSS simulator signal are read in the reading step from the virtual satellite and from the second virtual satellite which have simulated constant distances to the read device. If the distances remain constant during the measurement, this avoids Doppler effects.

The approach presented here further provides a device which is designed to carry out, control or implement the steps of a variant of a method presented here in corresponding devices. The object on which the approach is based can be achieved quickly and efficiently also by means of this embodiment variant of the approach in the form of a device.

For this purpose, the device can have at least one computing unit for processing signals or data, at least one storage unit for storing signals or data, at least one interface to a sensor or to an actuator for reading sensor signals from the sensor or for outputting data signals or control signals to the actuator and/or at least one communication interface for reading or outputting data which are embedded in a communication protocol. The computing unit can be, for example, a signal processor, a microcontroller or the like, wherein the storage unit can be a flash memory, an EEPROM or a magnetic storage unit. The communication interface can be designed to read or output data in a wireless and/or wired manner, wherein a communication interface which can read or output wired data can read or output said data, for example electrically or optically, from or into a corresponding data transmission line.

A device can be understood here to mean an electrical device which processes sensor signals and outputs control signals and/or data signals depending thereon. The device can have an interface which can be designed in the form of hardware and/or software. In a hardware-based design, the interfaces can, for example, be part of a system ASIC which contains a wide variety of functions of the device. However, it is also possible for the interfaces to be dedicated, integrated circuits or to consist at least partially of discrete components. In a software-based design, the interfaces can be software modules which are present, for example, on a microcontroller along with other software modules.

In one advantageous design, a method for detecting a group delay variation for a navigation sensor for a navigation system for a vehicle is controlled by the device. For this purpose, the device can, for example, access sensor signals such as a first GNSS simulator signal from a virtual satellite of a virtual global navigation satellite system at a first start time and a second GNSS simulator signal from the virtual satellite or at least one second virtual satellite of the navigation satellite system at a second time different from the first time. The control is performed by means of actuators such as a read device which is designed to read the first GNSS simulator signal and the second GNSS simulator signal, and a determination device which is designed to determine the group delay variation using the first GNSS simulator signal and the second GNSS simulator signal.

A navigation sensor for a navigation system for a vehicle having this device is further presented. A navigation sensor of this type is usable for a navigation system, wherein a group delay variation of the navigation sensor can be detected thanks to the device, or has already been detected before a use of the navigation sensor in connection with the navigation system.

A computer program product or computer program having program code which can be stored on a machine-readable carrier or storage medium such as a semiconductor storage device, a hard disk storage device or an optical storage device and is used to carry out, implement and/or control the steps of the method according to one of the embodiments described above, in particular when the program product or program is executed on a computer or a device, is also advantageous.

BRIEF DESCRIPTION OF THE DRAWINGS

Exemplary embodiments of the approach presented here are explained in detail in the drawings and in the following description. In the drawings.

BRIEF DESCRIPTION OF THE DRAWINGS

In the following description of favorable exemplary embodiments of the present approach, the same or similar reference numbers are used for similarly acting elements shown in the different figures, wherein a repeated description of these elements is omitted.

Figure 1:
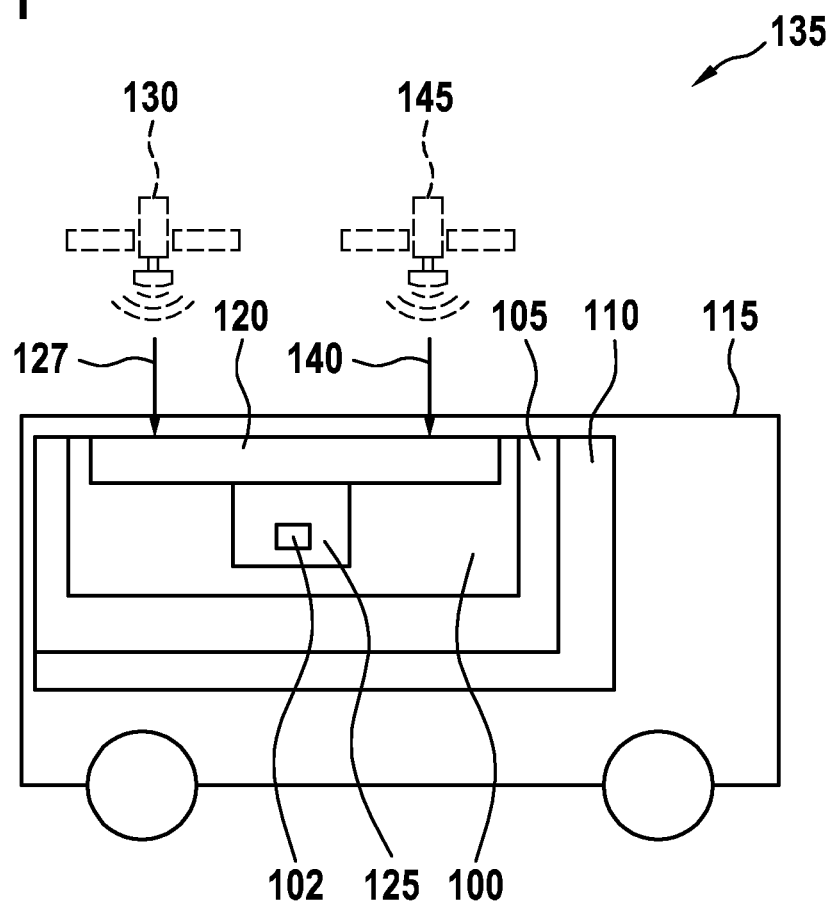
FIG. 1 shows a schematic view of a device for detecting a group delay variation for a navigation sensor for a navigation system for a vehicle according to one exemplary embodiment.

FIG. 1 shows a schematic view of a device 100 for detecting a group delay variation 102 for a navigation sensor 105 for a navigation system 110 for a vehicle 115 according to one exemplary embodiment.

Merely by way of example, the device 100 according to this exemplary embodiment is incorporated in or on the navigation sensor 105 which, similarly merely by way of example, is part of the navigation system 110 of the vehicle 115. According to this exemplary embodiment, the vehicle 115 designed as a vehicle 115 drivable in a highly automated manner.

The device 100 has a read device 120 and a determination device 125. The read device 120 is designed to read a first GNSS simulator signal 127 from a virtual satellite 130 of a virtual global navigation satellite system 135 at a first time and a second GNSS simulator signal 140 from the virtual satellite 130 or at least one second virtual satellite 145 of the virtual navigation satellite system 135 at a second time different from the first time. The determination device 125 is designed to determine the group delay variation 102 using the first GNSS simulator signal 127 and the second GNSS simulator signal 140.

The virtual global navigation satellite system 135 is a simulated navigation satellite system scenario. According to one exemplary embodiment, this virtual navigation satellite system 135 has only the one virtual satellite 130, or, according to this exemplary embodiment, additionally the second virtual satellite 145. According to an alternative exemplary embodiment, the virtual navigation satellite system 135 comprises any number of further virtual satellites whose further GNSS simulator signals are readable by the read device 120 and using which the determination device 125 then determines the group delay variation 102 according to one exemplary embodiment.

According to this exemplary embodiment, the virtual navigation satellite system 135 is a virtual GLONASS scenario, wherein the virtual satellite 130 is designed as a virtual GLONASS satellite and the virtual second satellite 145 is designed as a further virtual GLONASS satellite. The first GNSS simulator signal 127 of the virtual GLONASS satellite and the second GNSS simulator signal 145 of the further virtual GLONASS satellite have different frequencies according to this exemplary embodiment.

According to an alternative exemplary embodiment, the virtual satellite 130 and/or the second virtual satellite 145 are designed as virtual GPS satellites or virtual Galileo satellites and/or the first GNSS simulator signal 127 and the second GNSS simulator signal 145 have the same frequency.

According to one exemplary embodiment, the read device 120 has at least one or more GNSS receivers to read the GNSS simulator signals 127, 140, or is designed to read received signals from such GNSS receivers of the navigation sensor 105 from the GNSS receivers.

According to this exemplary embodiment, the virtual satellite 130 and the second virtual satellite 145 have a simulated same distance to the read device 120 or to the GNSS receivers. According to an alternative exemplary embodiment, the virtual satellite 130 and the second virtual satellite 145 have simulated different distances to the read device 120 or to the GNSS receivers.

According to this exemplary embodiment, the virtual satellite 130 and the second virtual satellite 145 have simulated constant distances to the read device 120 or to the GNSS receivers.

According to this exemplary embodiment, the determination device 125 is designed to evaluate the first GNSS simulator signal 127 in order to obtain a first measured quantity and to evaluate the second GNSS simulator signal 140 in order to obtain a second measured quantity and in order to determine the group delay variation 102 using the first measured quantity and the second measured quantity. According to this exemplary embodiment, the determination device 125 is designed to evaluate the first GNSS simulator signal 127 in order to obtain a first pseudo distance representing a distance from the virtual satellite 130 to the read device 120 as the first measured quantity, and to evaluate the second GNSS simulator signal 140 in order to obtain a second pseudo distance representing a distance from the second virtual satellite 145 to the read device 120 as the second measured quantity. According to this exemplary embodiment, the determination device 125 is further designed to determine the group delay variation 102 by forming the difference between the first measured quantity and the second measured quantity, i.e. the two pseudo distances here.

The device 100 presented here advantageously enables a verification of a group delay variation 102, "GDV" for short, during an "end-of-line" test or "end-of-life" test, "EOL test" for short.

The navigation sensor 105 can also be referred to as a motion sensor and/or position sensor for automated vehicles 115 and is designed to calculate a high-accuracy vehicle position using navigation satellite data such as GPS, GLONASS and/or Galileo. In addition, correction data from correction services are also used in the navigation sensor 105 in order to calculate the position of the vehicle 115 even more accurately. Together with the received navigation satellite data, "GLASS data" for short, the navigation sensor 105 is designed to read a high-accuracy time, such as Universal Time, and use it for the accurate position determination.

In manufacturing, it is necessary to monitor the quality of the high-frequency path of a navigation module with the components installed therein at the end of the line. One important parameter here is the group delay variation 102. The group delay, i.e. the time which signals at different frequencies require to pass through the filter arrangement of the navigation module is important, particularly for GLONASS (Global Navigation Satellite System) satellites. Unlike GPS satellites, each GLONASS satellite transmits at its own frequency. Differences in the delay directly affect positional accuracy and can possibly result in inaccuracies in the distance calculation. A delay difference of one nanosecond corresponds to a distance error of approximately 30 cm.

The group delay variation 102 is verifiable at the end of the line thanks to the device 100 by means of an indirect measurement.

Substantial advantages of the approach presented here comprise, inter alia, an indirect measurement of the GDV through a skillful choice of a suitable GNSS simulator scenario. According to one exemplary embodiment, the virtual navigation satellite system 135 is designed as a virtual static GLONASS scenario for as many virtual satellites 130, 145 as possible with one or more of the following characteristics:

constant distance from the navigation sensor 105 to the virtual satellites 130, 145—static satellite scenario—thus producing no Doppler effects,
same distance from the navigation sensor 105 to the virtual satellite 130, 145—static satellite scenario,
widest possible frequency spectrum.

According to this exemplary embodiment, the determination device 125 performs an evaluation of a measured quantity provided by the read device 120 and/or the GNSS receivers in each case in order to obtain a pseudo distance, also referred to as a pseudorange. By forming the difference between these pseudoranges of the different virtual satellite 130, 145, the determination device 125 according to this exemplary embodiment represents the frequency-resolved delay differences.

Figure 2:
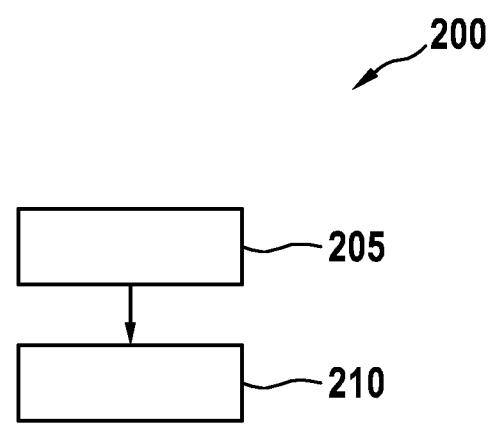
FIG. 2 shows a flow diagram of a method for detecting a group delay variation for a navigation sensor for a navigation system for a vehicle according to one exemplary embodiment.

FIG. 2 shows a flow diagram of a method 200 for detecting a group delay variation for a navigation sensor for a navigation system for a vehicle according to one exemplary embodiment. This can be a method 200 which can be carried out by the device described in FIG. 1.

The method 200 comprises a reading step 205 and a determining step 210. In the reading step 205, at least one first GNSS simulator signal is read by means of a read device from a virtual satellite of a virtual global navigation satellite system at a first time, and a second GNSS simulator signal is read from the virtual satellite or at least one second virtual satellite of the virtual navigation satellite system at a second time different from the first time. In the determining step 210, the group delay variation is determined using the first GNSS simulator signal and the second GNSS simulator signal.

The method steps presented here can be repeated and can also be carried out in a sequence other than the sequence described.

If an exemplary embodiment comprises an "and/or" link between a first feature and a second feature, this is to be interpreted as meaning that the exemplary embodiment has both the first feature and the second feature according to one embodiment, and has either only the first feature or only the second feature according to a further embodiment.

The invention claimed is:

1. A method for detecting a group delay variation for a navigation sensor for a navigation system for a vehicle, the method comprising:
   reading, using a read device, at least one first GNSS simulator signal from a first virtual satellite of a virtual global navigation satellite system at a first time, and reading a second GNSS simulator signal from one of the first virtual satellite and at least one second virtual satellite of the virtual navigation satellite system, at a second time different from the first time; and
   determining the group delay variation using the at least one first GNSS simulator signal and the second GNSS simulator signal.

2. The method as claimed in claim 1, the determining the group delay variation further comprising:
   evaluating the at least one first GNSS simulator signal to obtain a first measured quantity;
   evaluating the second GNSS simulator signal to obtain a second measured quantity; and
   determining the group delay variation using the first measured quantity and the second measured quantity.

3. The method as claimed in claim 2, the determining the group delay variation further comprising:
   determining the group delay variation by forming a difference between the first measured quantity and the second measured quantity.

4. The method as claimed in one of claim 2, the determining the group delay variation further comprising:
   evaluating the at least one first GNSS simulator signal to obtain a first pseudo distance representing a distance from the first virtual satellite to the read device as the first measured quantity; and
   evaluating the second GNSS simulator signal to obtain a second pseudo distance representing a distance from the at least one second virtual satellite to the read device as the second measured quantity.

5. The method as claimed in claim 1, the reading further comprising at least one of:
   reading the at least one first GNSS simulator signal from one of a virtual GLONASS satellite, a virtual GPS satellite, and a virtual Galileo satellite; and
   reading the second GNSS simulator signal from one of a virtual GLONASS satellite, a virtual GPS satellite, and a virtual Galileo satellite.

6. The method as claimed in claim 1, wherein the at least one first GNSS simulator signal and the second GNSS simulator signal have different frequencies.

7. The method as claimed in claim 1, wherein the first virtual satellite and the at least one second virtual satellite have a simulated same distance to the read device.

8. The method as claimed in claim 1, wherein the first virtual satellite and the at least one second virtual satellite have simulated different distances to the read device.

9. The method as claimed in claim 1, wherein the first virtual satellite and the at least one second virtual satellite have simulated constant distances to the read device.

10. The method according to claim 1, wherein the method is carried out by a computer program.

11. A device for detecting a group delay variation for a navigation sensor for a navigation system for a vehicle, the device being configured to:
    read, using a read device, at least one first GNSS simulator signal from a first virtual satellite of a virtual global navigation satellite system at a first time, and reading a second GNSS simulator signal from one of the first virtual satellite and at least one second virtual satellite of the virtual navigation satellite system, at a second time different from the first time; and
    determine the group delay variation using the at least one first GNSS simulator signal and the second GNSS simulator signal.

12. The device according to claim 11, wherein the navigation sensor includes the device having a device.

13. A non-transitory machine-readable storage medium that stores a computer program for detecting a group delay variation for a navigation sensor for a navigation system for a vehicle, the computer program being configured to, when executed by a device, cause the device to:
    read, using a read device, at least one first GNSS simulator signal from a first virtual satellite of a virtual global navigation satellite system at a first time, and reading a second GNSS simulator signal from one of the first virtual satellite and at least one second virtual satellite of the virtual navigation satellite system, at a second time different from the first time; and
    determine the group delay variation using the at least one first GNSS simulator signal and the second GNSS simulator signal.

* * * * *

UNITED STATES PATENT AND TRADEMARK OFFICE
CERTIFICATE OF CORRECTION

PATENT NO. : 12,044,783 B2
APPLICATION NO. : 17/757259
DATED : July 23, 2024
INVENTOR(S) : Conrad et al.

Page 1 of 1

It is certified that error appears in the above-identified patent and that said Letters Patent is hereby corrected as shown below:

In the Claims

In Claim 12, at Column 8, Line 30: "includes the device having a device." should read --includes the device--.

Signed and Sealed this
Eighteenth Day of February, 2025

Coke Morgan Stewart
*Acting Director of the United States Patent and Trademark Office*